(12) United States Patent
Worton

(10) Patent No.: US 9,994,416 B2
(45) Date of Patent: Jun. 12, 2018

(54) BULK WIRE DISTRIBUTION CART

(71) Applicant: Ken Worton, Midvale, UT (US)

(72) Inventor: Ken Worton, Midvale, UT (US)

(*) Notice: Subject to any disclaimer, the term of this patent is extended or adjusted under 35 U.S.C. 154(b) by 0 days. days.

(21) Appl. No.: 15/297,320

(22) Filed: Oct. 19, 2016

(65) Prior Publication Data
US 2017/0190536 A1 Jul. 6, 2017

Related U.S. Application Data

(60) Provisional application No. 62/244,925, filed on Oct. 22, 2015.

(51) Int. Cl.
B65H 49/32 (2006.01)
B65H 49/20 (2006.01)
B65H 75/14 (2006.01)
B65H 54/20 (2006.01)
B65H 49/38 (2006.01)

(52) U.S. Cl.
CPC ........... *B65H 49/32* (2013.01); *B65H 49/205* (2013.01); *B65H 49/324* (2013.01); *B65H 49/38* (2013.01); *B65H 54/20* (2013.01); *B65H 75/146* (2013.01); *B62B 2202/025* (2013.01); *B65H 2701/341* (2013.01)

(58) Field of Classification Search
CPC .... B65H 49/205; B65H 49/32; B65H 49/324; B65H 49/38; B65H 54/20; B65H 75/146; B65H 75/403; B65H 2701/341; H02G 1/08; B62B 2202/025
See application file for complete search history.

(56) References Cited

U.S. PATENT DOCUMENTS

| 2,477,871 | A | * | 8/1949 | Grogan | B62B 3/12 |
| | | | | | 280/47.34 |
| 5,462,298 | A | * | 10/1995 | Bodine | B65H 75/403 |
| | | | | | 242/399.2 |
| 5,988,555 | A | * | 11/1999 | Unruh | B65H 49/32 |
| | | | | | 242/470 |
| 6,116,533 | A | * | 9/2000 | Elder | B65H 49/325 |
| | | | | | 242/557 |
| 6,422,504 | B1 | * | 7/2002 | Elder | B65H 49/32 |
| | | | | | 211/85.5 |
| 6,523,776 | B1 | * | 2/2003 | Elder | B65H 49/32 |
| | | | | | 211/85.5 |
| 2001/0030257 | A1 | * | 10/2001 | Fletcher | B65H 57/16 |
| | | | | | 242/557 |
| 2003/0108391 | A1 | * | 6/2003 | Essay | B65H 49/305 |
| | | | | | 405/154.1 |
| 2008/0048063 | A1 | * | 2/2008 | Wells | B65H 49/32 |
| | | | | | 242/557 |
| 2009/0065457 | A1 | * | 3/2009 | Kostigian | A47F 7/175 |
| | | | | | 211/85.5 |
| 2012/0223179 | A1 | * | 9/2012 | Galindo Gonzalez | B65H 49/32 |
| | | | | | 242/598.5 |
| 2013/0341455 | A1 | * | 12/2013 | Worton | B65H 49/32 |
| | | | | | 242/557 |

* cited by examiner

*Primary Examiner* — William E Dondero
(74) *Attorney, Agent, or Firm* — J. Todd Rushton

(57) ABSTRACT

The present invention is a bulk wire distribution cart configured to dispense bulk conductor wires and a single ground wire efficiently, safely and without slack or wire damage, directly from the cart to the electrical conduit.

9 Claims, 7 Drawing Sheets

BULK WIRE DISTRIBUTION CART

BACKGROUND

The present invention relates to a bulk electrical wire distribution cart or more specifically for a bulk wire cart having a plurality or inter-locking spools and a releasable ground conductor spool, the cart configured for easy transportation of heavy wire on a job site by a single user and then securely locked into place to allow the bulk conductor and ground wires to be pulled directly from the spools into the electrical conduits.

Commercial electrical project may require thousands of feet of electrical wire which may weigh several tons. It is typical that conductor wire, and bare ground wire, is provided to the job site on wooden spools that are handled by a forklift. The contractor is required to move the spools individually to the desired location and then carefully roll the spools on edge before an axle is inserted through the spool and it is again lifted by the forklift onto a stand of some sort. The process is time consuming and there is high probability that the wooden spools are damaged. It is common for the spool rim to become damaged and cause the wire to snag when being pulled off the spool and there is also the possibility that a spool is dropped and breaks requiring the wire to be completely re-spooled or to be pulled while on the ground. It is common that wire spools and frames are moved multiple times during the fitment of an electrical project and each move requiring separate handling of wire spools and the reoccurring risk of damage.

Wire distributors and electrical wholesalers have addressed some of these issues by providing bulk wire on a towable trailer. However, a large trailer may be difficult to get into position on job site, especially in situation like a tenant finish in an office building or shopping center where there is limited access to the interior of the building. There is also a known issue that when using gang spools, the insulated conductor wire will feed off the spool at a slower rate than the smaller diameter ground conductor wire, which will cause the ground conductor to pile up on the ground in front of the gang spools.

What is needed is a bulk wire distribution cart that allows wire to be transported to a job site, is easily moved around the site by hand, can be securely locked into place and remedies the ground conductor spooling issue.

SUMMARY OF THE INVENTION

The present invention is a bulk wire distribution cart configured to handle a standard electrical wiring configuration of four color-coded insulated conductor wire strands and a bare conductor wire strand using a gang spool arrangement. The bulk wire distribution cart designed to be securely locked into place and the ground wire spool configured to spin independently of the conductor wire spools.

A first embodiment of the present invention or bulk wire distribution cart includes a lower frame assembly in a rectangular configuration, the frame having long side members with shorter cross members at each end. Upper frame supports are connected to the lower frame in an a-frame assembly and configured to support a central spool shaft or axle on a plurality of roller bearings. A plurality of wire spools configured to be removably attached to the central spool shaft. The frame including, a pair of high ground pressure wheels aligned parallel with the long side rails of the frame, a single front caster wheel is attached to the front portion of the frame within a front mounting place assembly, the front caster wheel also being a high pressure wheel formed with metal hub and a solid rubber tire. A handle is attached to the front caster to allow a user to pull and maneuver the cart.

In one embodiment the rear wheels and the front caster wheel are such a diameter as to allow the cart to run over small anomalies in a hard floor, in particular the wheels are such diameter which allows a loaded cart to run over electrical extension cords typical to construction projects.

In one embodiment the rear wheels are parallel with the side frame rails and are non-steering; this arrangement allows the cart to be pulled across a sloped floor or ramp and still maintain direction control or steering.

In one embodiment of the present invention, the frame includes a pair of locking skids or "landing gear" configured to disengage or lift the wheels from the surface and to secure the cart in a fixed position. One embodiment includes a cam-over mechanism which extends or forces front and back dog-bone linkages perpendicular to the floor and moves the skids into a lowered position. The dog-bone linkage can be engaged using a large breaker-bar with a socket compatible with an actuation lug extending through the side rail. In another embodiment the front caster pull handle includes a socket configured to engage the actuation lug. Another embodiment includes a spring loaded safety pin must be moved into an open position before raising or lowering the locking skids. In one embodiment the locking skids include a rubber bottom plate to more securely engage the floor. The locking skids are also beneficial when the distribution cart is being transported by semi-truck or on a trailer, the skids are configured to securely engage the loading deck and the frame may be secured using chains or ratcheting tie downs.

In one embodiment the plurality of wire spools are configured as individual spools having plurality of locking dogs which engage the adjacent conductor wire spool, additionally the hub portion of each spool includes a set screw or bolt configured to engage the outside diameter of the spool shaft. This design allows the user to replace an individual wire spool in the event a spool is bent or otherwise damaged.

In one embodiment of the present invention, the ground wire spool is configured to be independently rotatable or locked into the same rotation as the plurality of the conductor wire spools. It may be desirable to lock the ground wire spool to the plurality of conductor wire spools when loading bulk wire onto the cart. In this configuration, the bulk wire cart can be positioned in a supply warehouse and the desired color coded conductor wire and the bare ground wire can be started on the corresponding spool and then coiled onto the bulk wire distribution cart. The bulk wire can be coiled or reeled on by hand or in one embodiment an air motor or electric drive motor may be fixed to the cart frame and used to turn the spool support shaft and coil the bulk wire. When a user is pulling wire from the distribution cart it is typical for the plurality of wires to be pulled at the same time, and as discussed above, since the bare ground wire has a smaller diameter it will come off the ground spool at a faster rate than the insulated conductor wires, this will cause the ground wire to go slack and pile up in front of the distribution cart. When the ground conductor spool is disengaged, it will rotate independent of the conductor wire spools and the issue of unequal uncoiling rate is mitigated.

Typical use of the bulk wire distribution cart includes, delivering the cart to an electrical supply warehouse or project materials laydown warehouse, moving the cart proximate the bulk wire spools positioned on a wire rack, axle or spindle, engaging the locking skids to secure the cart in place, stringing the bulk wires through a length counter and guides or guide rings aligned with the bulk distribution cart wire spools, attaching the conductor wires and the ground wire to the independent spools, locking the ground wire spool to rotate with the conductor wire spools, installing a winding drive motor on the spool shaft and cart frame, engaging the motor to coil a specific length of wire on the individual wire spools (it is typical for the bulk cart to be loaded for a specific wire pull, for example, if the installed conduit requires a 1000 ft. run of wire, the bulk wire cart would be loaded with 1000 ft. of wire, moved proximate the conduit and then the full 1000 ft. of wire would be pulled into the conduit directly off the spools), cut the bulk wire to length, remove the winding motor, move the cart by hand to a loading dock where the cart is loaded onto a truck or trailer, either by wheeling the cart off of a level loading deck or by a forklift where the tines may be extended under the locking skids. Once on the truck, the bulk distribution cart is secured in place by engaging the locking skids, tying down the cart and moving the cart to the work site. At the work site the cart will be unloaded, moved proximate the conduit to be pulled, the locking skids are again lowered into place, the individual conductor wires and the ground wire are prepared to be pulled at same time by typically taping the wires into a bundle and then securing the wires in wire pulling grip, the wire pulling grip is secured to a nylon rope that has been sent through the conduit, the ground wire spool is released to spin independent of the conductor wire spools and the proper length of wire is pulled into the conduit. If all of the wire is pulled from the bulk distribution cart, the cart can be taken back to the warehouse for reloading, if there is additional wire on the cart it can be moved by hand to another conduit and that wire run may also be pulled using the procedure described above.

BRIEF DESCRIPTION OF THE DRAWINGS

The features and advantages of the disclosure will become apparent from a consideration of the subsequent detailed description presented in conjunction with the accompanying drawings in which.

DETAILED DESCRIPTION

Figure 1:
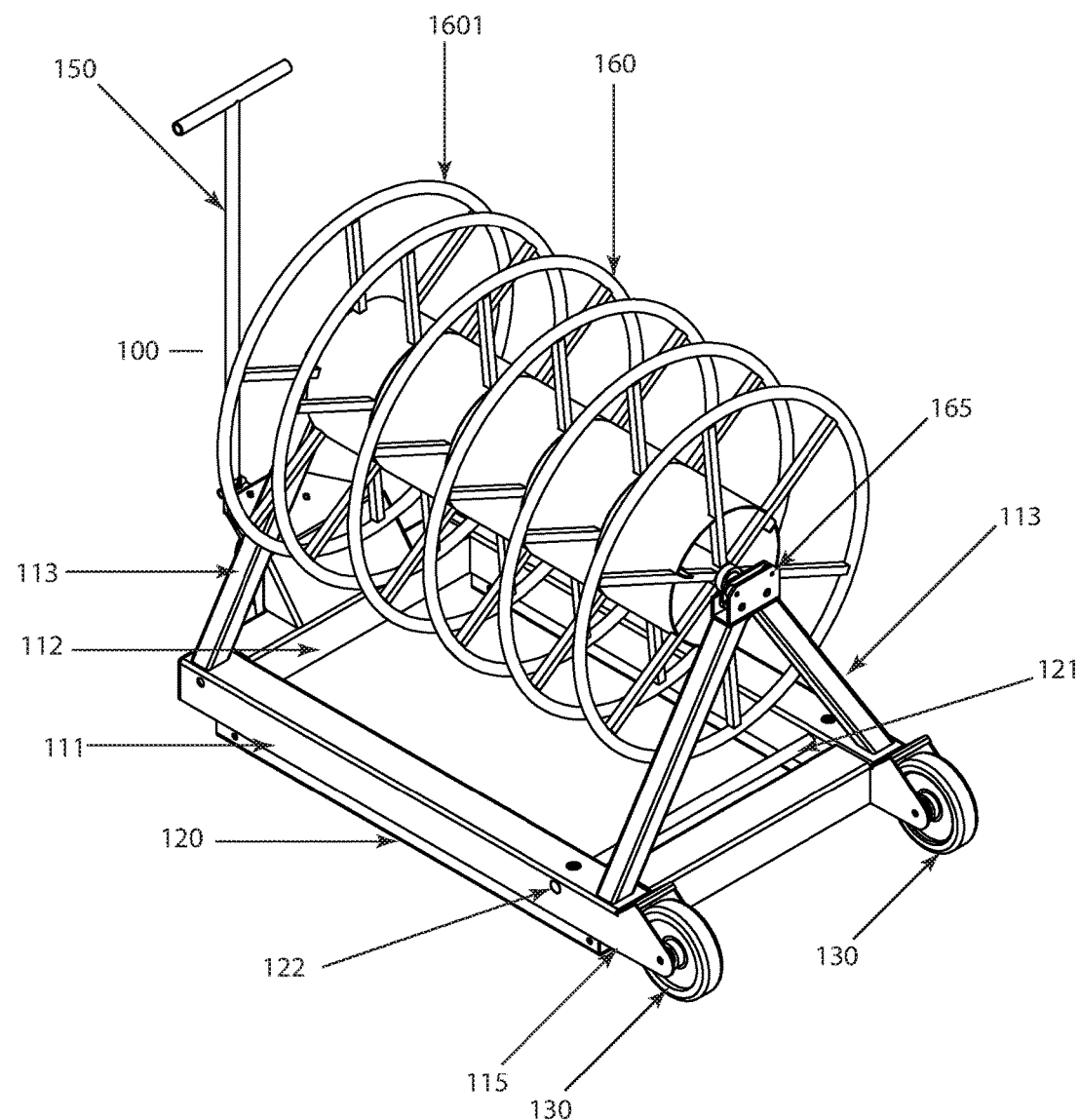
FIG. 1 is a perspective view of a bulk wire distribution cart according to an embodiment of the present disclosure.
Figure 2:
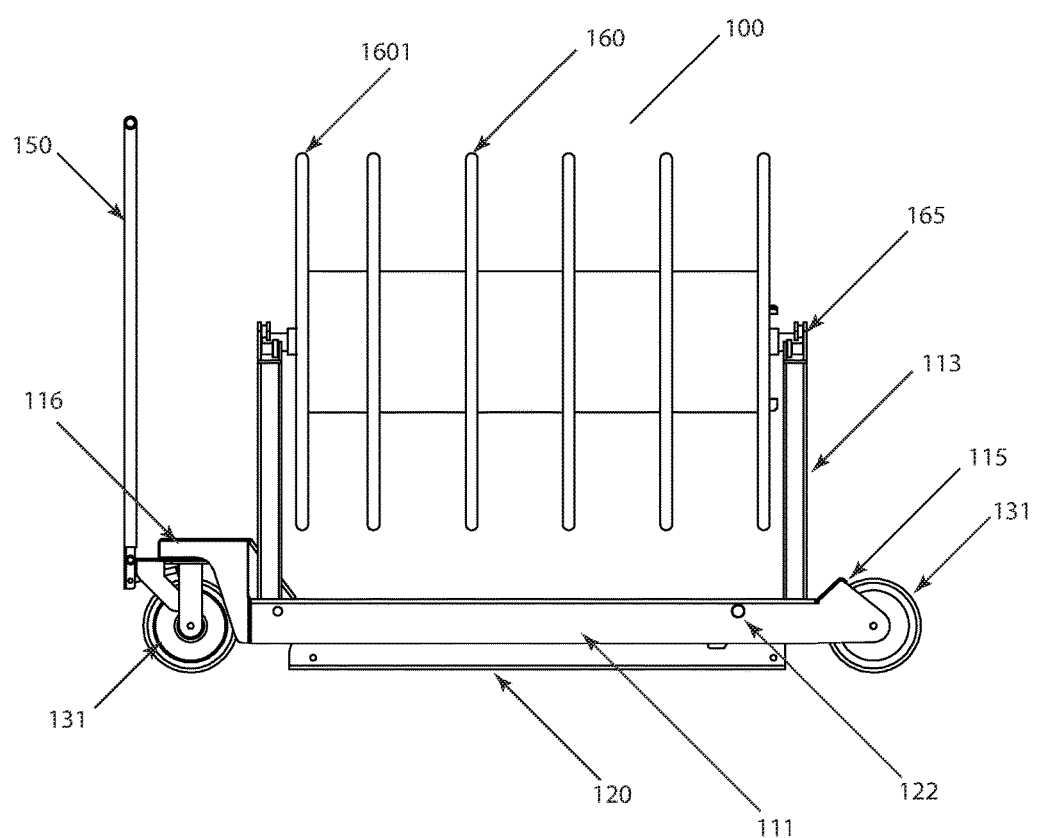
FIG. 2 is a side view of a bulk wire distribution cart according to an embodiment of the present disclosure.

FIGS. 1 through 7 are one embodiment of the bulk wire distribution cart 100 of the present invention. The distribution cart 100 comprising a substantially rectangular lower frame including side rails 111 and end rails 112, a reel support frame including a-frame uprights 113 attached to the lower frame proximate the end rails 112. The uprights 113 including a roller bearing assembly 165 configured to receive and retain a spool axle shaft 166. Conductor wire spools 160 and the ground wire spool 1601 including a central hub configured to slide over the axle shaft 166. In one embodiment the central hub will include a set screw 1602 to engage the outside surface of the axle shaft 166. Lower frame assembly including rear wheels 130 which fixedly aligned parallel with side rails 111, the rear wheels 130 sized to allow the wheels to roll over typical job site obstacles, including minor cracks or seams in the flooring and over extension cords. The parallel alignment of the rear wheels 130 also provides that a loaded cart will track straight when towed on an uneven surface. A single front wheel 131 is configured as a steerable caster assembly 116 including a tow handle 150. The lower frame also supports a landing skid 120 assembly configured to be lowered into the floor using a cam-over mechanism which is engaged by turning an engagement lug at point 122 using either an extended breaker bar or by having a reciprocal lug tool formed in the tow handle 150. The landing skid assembly is best described in FIG. 7 and includes a cam-over pivot shaft 121, cams 123 and skids 120. One embodiment of skids 120 includes a rubber or similar non-slip material attached to the bottom of the skids 120.

Figure 6:
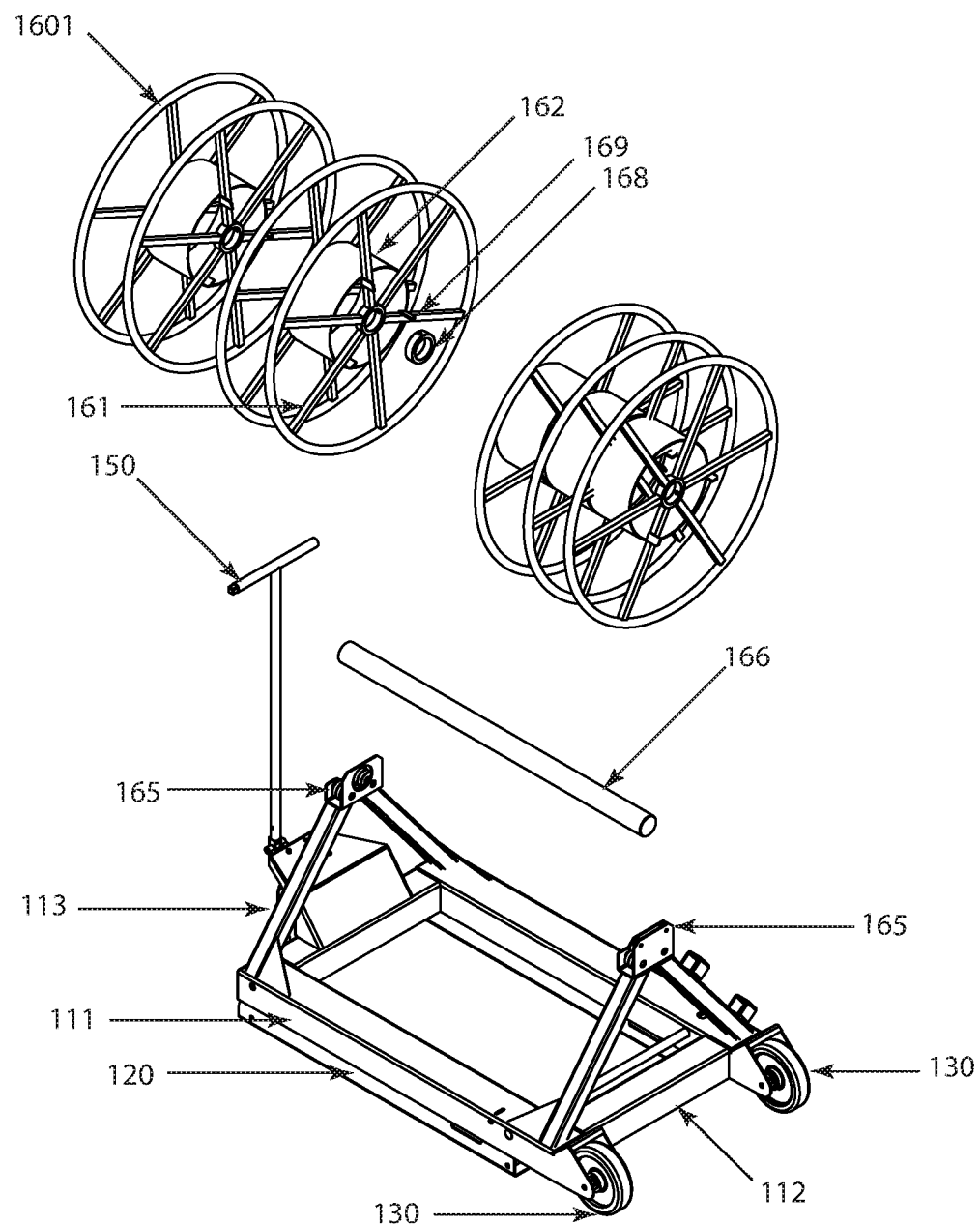
FIG. 6 is an exploded perspective view of a bulk wire distribution cart according to an embodiment of the present disclosure; and, FIG. 7 is an exploded perspective view of a bulk wire distribution cart according to an embodiment of the present disclosure.
Figure 7:
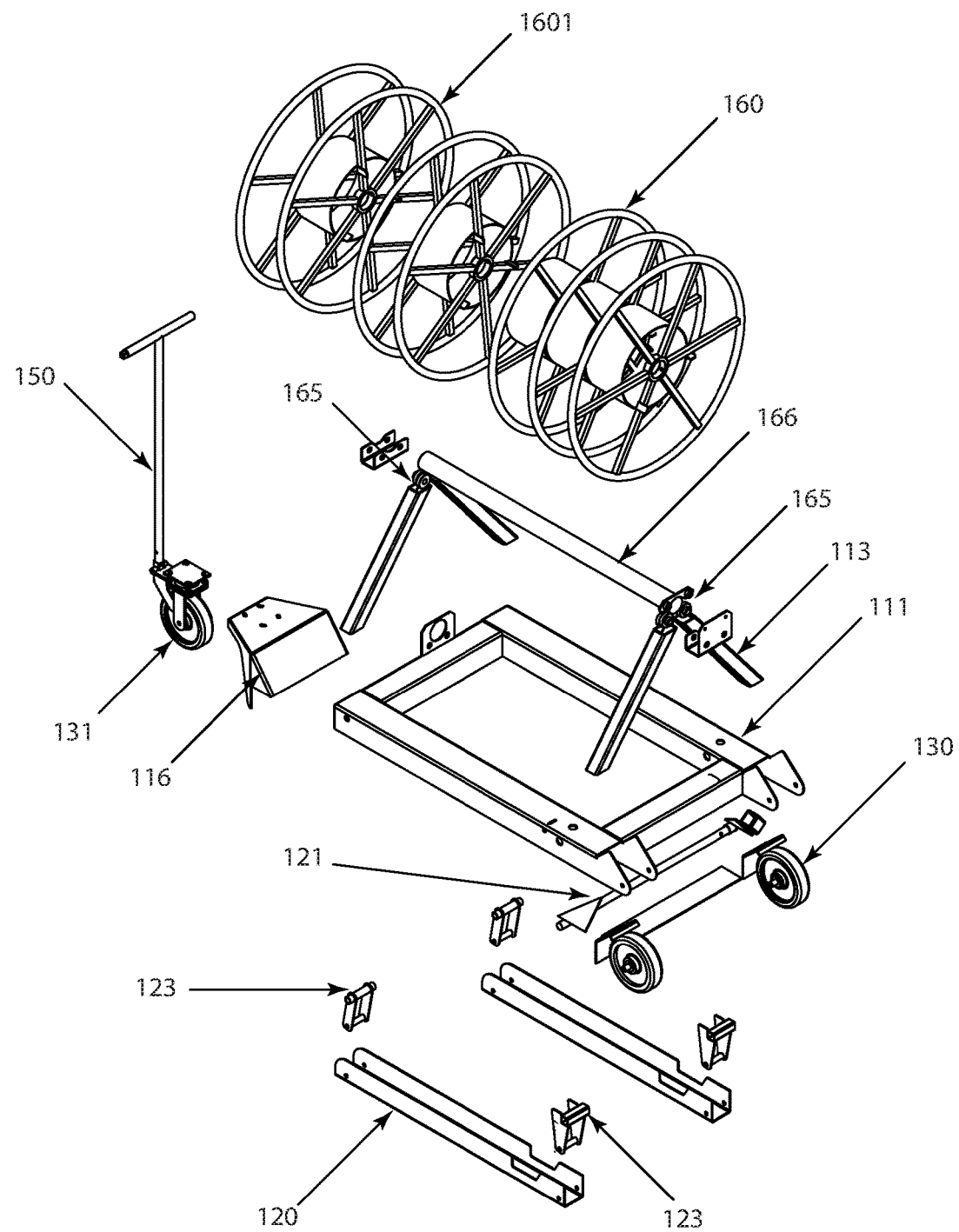

Wire spools 160 and 1601 as shown in FIG. 6 include a drum portion 162, spokes 161 and locking cogs 169 configured to engage the spokes 161 of an adjacent spool 160, 1601 and ensure that the spools 160, 1601 turn together. In one embodiment a stand-off spacer 168 is used to separate adjacent spools, disengaging the locking cogs 169 and allowing at least the ground conductor spool 1601 to turn independent of the other spools 160.

Figure 3:
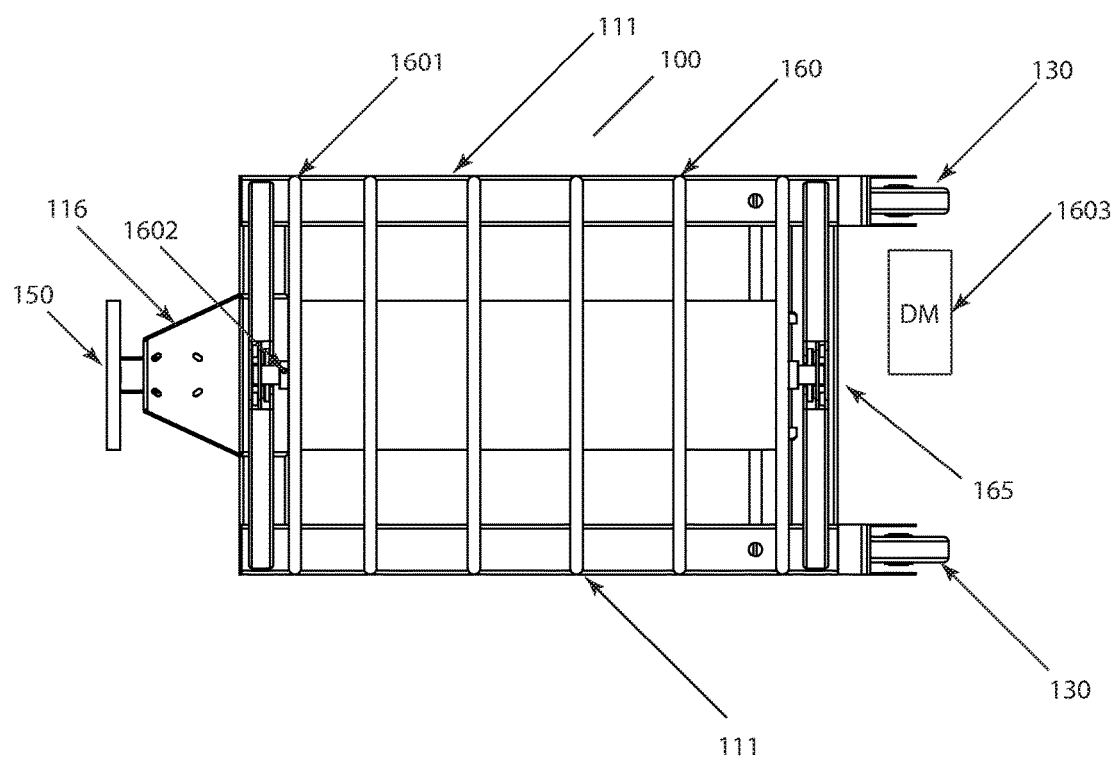
FIG. 3 is a top view of a bulk wire distribution cart according to an embodiment of the present disclosure.
Figure 4:
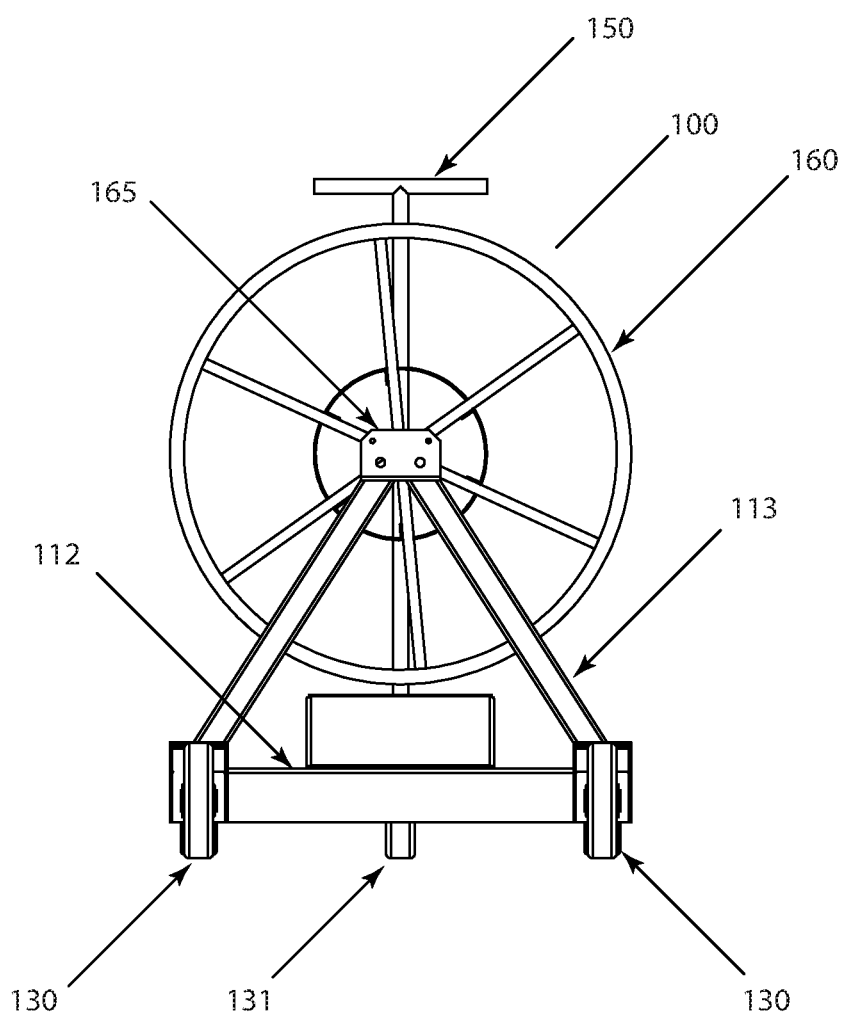
FIG. 4 is an end view of a bulk wire distribution cart according to an embodiment of the present disclosure.
Figure 5:
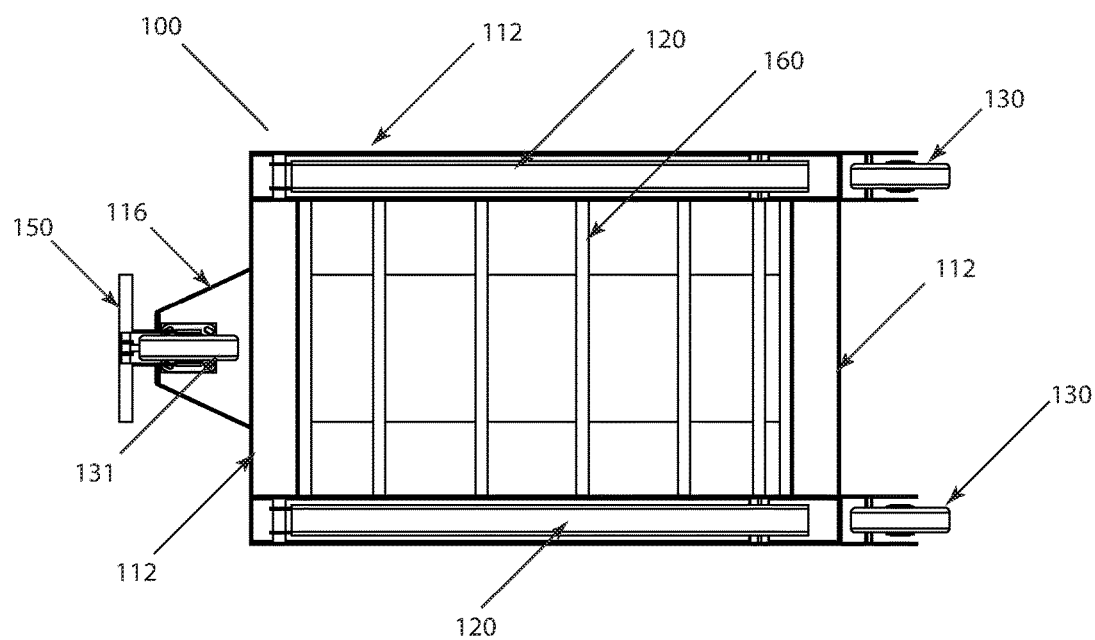
FIG. 5 is a bottom view of a bulk wire distribution cart according to an embodiment of the present disclosure.

One embodiment of the distribution cart 100, shown in FIG. 3, includes a drive motor 1603 configured to attach to support shaft 166 (FIGS. 6, 7) and allow a user to wind, or fill, wire onto the conductor wire spools 160 and the ground wire spool 1601.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:
1. A bulk wire distribution cart, including;
   a rectangular lower frame assembly having two longer side rails and shorter end rails,
   a pair of rear wheels aligned parallel with the side rails,
   a steerable front caster wheel,
   a tow handle,
   an a-frame assembly attached to the lower frame assembly,
      the a-frame assembly having a roller bearing cradle at each end,
      the roller bearing cradles configured to receive a spool support shaft,
   a plurality of conductor wire spools configured to fit on the spool support shaft,
   a ground wire spool configured to fit on the spool support shaft, the ground wire spool configured to rotate independent of the conductor wire spools, a locking skid assembly configured to render the distribution cart in a fixed position wherein the locking skid assembly comprises: a pair of locking skids, a cam-over mechanism, a cam pivot shaft, the cam pivot shaft including an engagement lug, and, the tow handle configured to rotate the engagement lug.

2. The distribution cart of claim 1 wherein the locking skids include a rubber bottom surface.

3. The distribution cart of claim 1 wherein the engagement lug is configured to be rotated using a breaker bar.

4. The distribution cart of claim 1 wherein the plurality of conductor wire spools and the ground wire spool include a plurality of lugs configured to engage an adjacent one of the plurality of spools.

5. The distribution cart of claim 1 including a stand-off spacer.

6. The distribution cart of claim 1 wherein the ground conductor spool includes a set screw configured to engage the spool support shaft.

7. The distribution cart of claim 1 including a drive motor configured to rotate the plurality of the conductor wire spools and the ground wire spool.

8. A method of pulling bulk wire comprising,
providing a bulk wire distribution cart,
the bulk wire distribution cart including,
a plurality of conductor wire spools,
a ground wire spool,
a pair of rear wheels,
a front caster wheel,
a tow handle,
a locking skid assembly,
the locking skid assembly including,
a pair of locking skids
a cam-over mechanism to engage the locking skids,
the cam-over mechanism including an engagement lug,
loading a plurality of conductor wires onto the plurality of conductor wire spools,
loading a ground wire onto the ground wire spool,
moving the bulk wire distribution cart using the tow handle to a desired work location having a wire conduit,
engaging the locking skid assembly by rotating the engagement lug, and,
simultaneously pulling the plurality of conductor wires off of the plurality of conductor wire spools and pulling the ground wire off of the ground wire spool and into the wire conduit.

9. The method of claim 8 wherein loading comprises,
providing a drive motor configured to rotate the plurality of conductor wire spools and the ground wire spool,
attaching a free end of a plurality of conductor wires to a drum of a reciprocal one of the plurality of conductor wire spools,
attaching a free end of a ground wire to a drum of the ground wire spool,
engaging the drive motor, and,
rotating the plurality of conductor wire spools and the ground wire spool to wind the wire onto the plurality of spools.

* * * * *